UNITED STATES PATENT OFFICE.

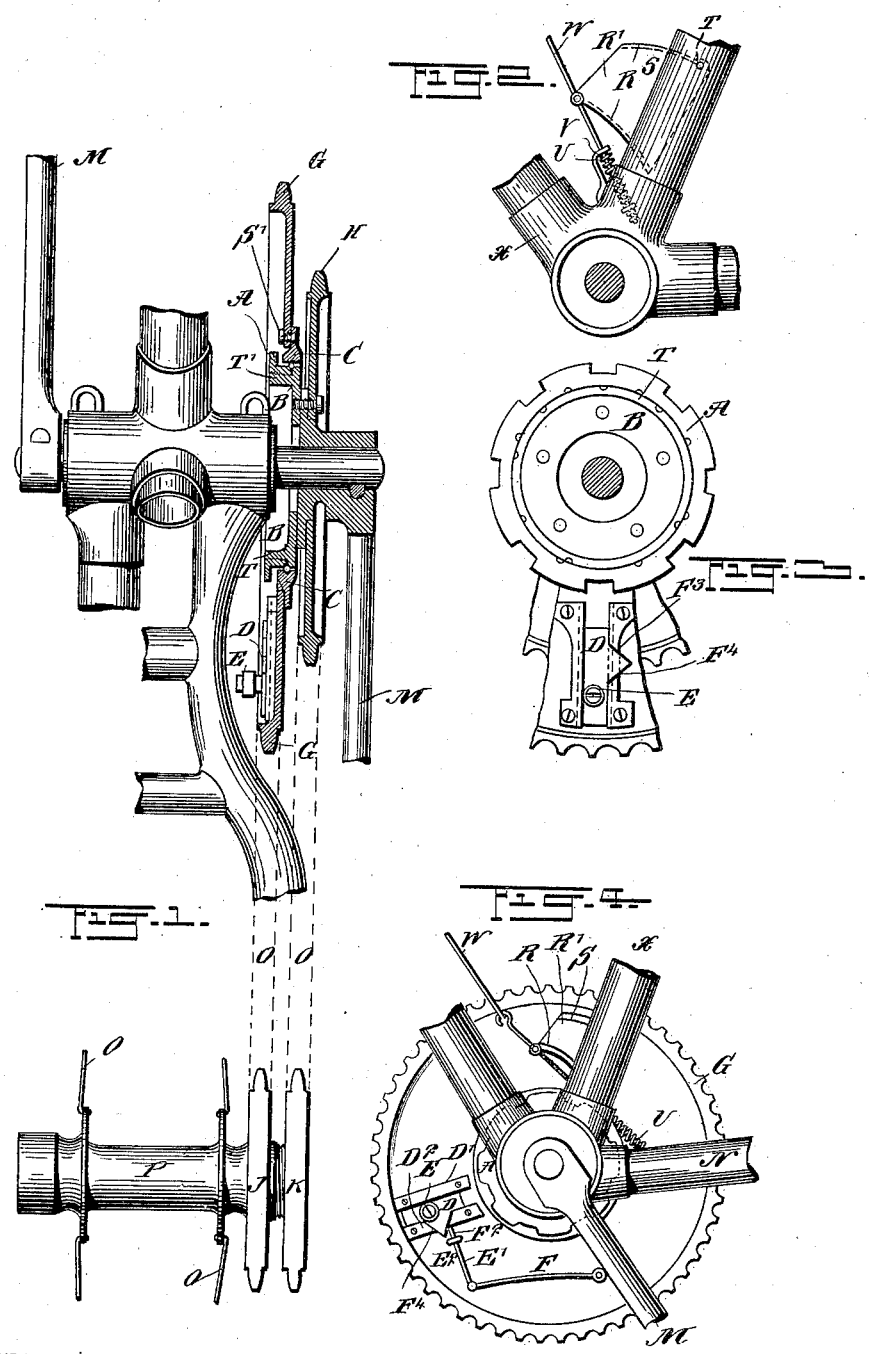

FRANCIS ARTHUR RICH, OF KARANGAHAKE, NEW ZEALAND.

VELOCIPEDE DRIVING-GEAR.

SPECIFICATION forming part of Letters Patent No. 707,012, dated August 12, 1902.

Application filed October 31, 1900. Serial No. 35,022. (No model.)

*To all whom it may concern:*

Be it known that I, FRANCIS ARTHUR RICH, mining engineer, a subject of Her Majesty the Queen of the United Kingdom of Great Britain and Ireland, and a resident of Karangahake, in the Provincial District of Auckland and Colony of New Zealand, have invented certain new and useful Improvements in Velocipede Driving-Gear, of which the following is a specification.

The object of this invention is to provide an improved changeable gearing for velocipedes; and to this end the invention consists of certain new and improved driving devices constructed, arranged, and combined with the parts of a velocipede, as hereinafter specified.

The accompanying drawings show four figures, of which—

Figure 1 is a general plan of an application of the invention. Fig. 2 indicates the changing-gear for this application. Fig. 3 shows the clutch-gear and its relation to recess-plate. Fig. 4 is view of the gearing as applied to a bicycle.

Letters of similar name and kind refer to similar parts in each of the figures.

A is the adjustment-piece of free sprocket-wheel ball-race. It also has recesses in its periphery to receive clutch D when changing sprocket-wheel G from a free to a fixed wheel—i. e., in this illustration when changing from the low to the high gear.

B is the portion of free sprocket-wheel G fixed to pedal-crank and which also forms part of the ball-race. It is provided with a threaded flange T.

C is the outer part of ball-race of free sprocket-wheel G, to which outer part the external rims of larger or smaller sprockets may be attached by means of screws S', if it is required to renew or change the sprocket in use.

D is the clutch, mounted in guides D' D², which goes into any one of the recesses in recess-plate A when it is desired to drive the velocipede by means of the sprocket-wheel G.

E is the friction-roller pin on clutch D, by means of which clutch D is thrown in or out of gear with recess-plate A.

F is the spring for maintaining clutch D in position either in or out of gear with recess-plate A. This it does by means of the plunger E', which is provided with a suitably-shaped end for engaging the triangular slide-piece D. The plunger passes through a guide E², fixed upon the wheel. The spring and plunger hold the clutch D either in engagement or out of engagement with the recessed wheel, accordingly as the plunger F² presses upon the inclined face F³ or F⁴.

G is the larger or high-gear sprocket-wheel, which is rendered relatively free or fixed, as desired, by means of the clutch D.

H is the smaller or low-gear sprocket-wheel.

J is the rear-hub sprocket-wheel corresponding to the larger pedal-crank sprocket-wheel G. In this illustration of my invention this sprocket-wheel J is shown as fixed; but it is obvious that this wheel J could be used as the changing-wheel, in which case the wheel G could be made permanently fixed to the pedal-crank, and it is my object that either wheel may be used for the changing-wheel. In either case the object of my invention would be gained—viz., that any one of the chains or equivalent connections for operation on the velocipede for the transmission of its driving power may be used for that purpose at the will of the operator, the other being thrown out of use by means of one of the sprocket-wheels belonging to each being rendered free.

The rear sprocket-wheel K is an ordinary clutch-wheel of the well-known one-way type and is connected with the lowest gear-wheel H. When the clutch D is in engagement with the recessed wheel A, the rear sprocket J has a higher speed than the rear sprocket K, but as the latter is a clutch-wheel it merely overruns the hub.

L is the lower front part of bicycle-frame.

M M are the double cranks.

N is the lower rear part of bicycle-frame.

O is the position or path of sprocket-chains.

P is the rear hub.

Q Q are the spokes of rear wheel.

R is the clutch-pin guide for throwing clutch D into gear with recess-plate A. S is the clutch-pin guide for throwing clutch D out of gear with recess-plate A. These guides are merely flanged edges of the rocking plate R'.

T is the stud fixed to frame-piece X, upon which clutch-pin guides R and S revolve.

U is the spring for holding clutch-pin guide in position. Shown in Fig. 2 as a spiral compression-spring working against lug V, attached to frame-piece X; and shown in Fig. 4 is a spiral tension-spring attached at one end to the frame-piece N and at the other to the clutch-pin guides.

V is the lug attached to frame-piece X for spring U to work against.

W is the connecting-wire between changing-lever and rocking plate carrying the clutch-pin guides.

X is the center piece of bicycle-frame.

The operation of the machine shown in the drawings is as follows: The rider working on the lower gear, as shown in Fig. 1—say while riding on heavy roads, against strong head wind, or climbing a steep grade—desires, having reached easier conditions of riding, to change into the higher gear and make pace. He merely actuates the wire W by any appropriate means, and thus shifts the position of the rocking plate R', so that as the roller-pin E revolves about the pedal-crank axle it comes in contact with the guide R and is forced in toward recess-plate A, when spring F throws clutch D into one of the recesses in plate A. Then as periphery of larger sprocket-wheel G travels faster than that of smaller sprocket-wheel H it is evident that the bicycle is being driven through the large sprocket G—i. e., by the higher gear—and the free wheel K, being driven faster than the rear hub upon which it is mounted, freely overruns the same. To change back again to the low gear, shift the plate R' upward, so that as the roller-pin E revolves around the crank-shaft axle it comes in contact with the guide S, and the clutch or lug D is thereby lifted out of the recess in plate A and held out by spring F. Now as the sprocket G is not actuated by the pedal-cranks the motive power falls on sprocket H and the bicycle is being driven on the low gear.

More gears may be fitted to the velocipede in same manner of course, only the one to be used being thrown into gear; but for ordinary use two gears are usually deemed sufficient, especially if, as in this invention, they can be of any useful ratio with regard to each other by using any desired size of sprocket-wheels.

From the foregoing it is evident that the rider has at his disposal at any time a low gear for rough or muddy roads, high head winds or hills, and one or more higher gears to take advantage of good roads or fair winds. Further, in coming downhill the rider has the choice of various methods of riding. For instance, he can, while using the higher gear, back-pedal to reduce or check speed, or, if the hill is not too steep, he can throw the clutch D out of gear with recess-plate A and then having a free wheel to each chain let the machine run downhill by the force of gravity, while his feet rest on the non-revolving pedals, as used with ordinary free-wheel single-gear, or, if the hill is very steep, he can use his brake.

With an ordinary fixed-sprocket single-gear chain-machine a foot-brake cannot be used nor can the pedals be prevented from revolving while running downhill. Again, with the ordinary single-gear free-wheel machine the rider cannot back-pedal, though he can use a foot-brake; but with this invention the rider has the choice of all these methods of riding downhill, besides being able to fall back on other safe methods of coming downhill in case of accident to the one in use at the time. This invention can be admirably adapted to velocipedes for either sex.

While in the drawings I have shown only a bicycle provided with this invention, I desire it to be understood that such invention is equally applicable and is intended to be applied to tricycles and other forms of velocipedes, and, further, that though only two different sets of driving-gears are shown more may be used similarly and that they may be either all on one side of the velocipede or arranged on each side of it, and in either case they may be arranged with lower or higher gears next the pedal or pedals, and any design of clutch, pawl, or pin may be used to fix the free wheels.

Having fully described this invention, what I desire to claim and secure by Letters Patent is—

1. A changeable-speed gear for velocipedes, comprising an ordinary friction-clutch free-wheel sprocket and a sprocket consisting of inner and outer members normally loose relative to each other, means for shifting a driven mechanism into operative engagement with said free-wheel sprocket or with said outer member at will, a rocking clutch for connecting together and for disconnecting said inner and outer members, a friction-roller revolubly mounted upon said rocking clutch, and a rocking plate provided with guides for engaging said roller for the purpose of shifting said clutch.

2. A changeable-speed gear for velocipedes, comprising an ordinary sprocket and a sprocket consisting of outer and inner members normally loose relatively to each other, traction members engaging said ordinary sprocket and said outer member, and also engaging the mechanism to be driven, a clutch for connecting together, and disconnecting, said inner and outer members, means for shifting the position of said clutch, and a spring for holding said clutch either in or out of gear.

3. A changeable-speed gear for velocipedes, comprising a sprocket free to rotate in one direction only, a sprocket comprising inner and outer members normally loose relatively to each other, means for shifting the driven mechanism at will into operative engagement with the first-mentioned sprocket or with said outer member, a clutch for connecting together and disconnecting said inner and outer members, a friction-roller revolubly mounted upon said clutch, and a rocking plate provided with guides for engaging said roller for the purpose of shifting said clutch.

4. A changeable-speed gear for velocipedes, comprising a middle sprocket and a sprocket consisting of inner and outer circular members, concentrate and normally loose relatively to each other, means for shifting the driven mechanism into operative engagement with said middle sprocket or with said outer member at will, a radially-movable clutch for connecting together and disconnecting said inner and outer members, a friction-roller revolubly mounted upon said clutch, and a rocking plate provided with guides for engaging said roller for the purpose of shifting said clutch.

5. A changeable-speed gear for velocipedes, comprising a middle sprocket and a sprocket consisting of inner and outer members normally loose relatively to each other, means for shifting the driven mechanism into operative engagement with said middle sprocket or with said outer member at will, a rocking clutch for connecting together and disconnecting said inner and outer members, said rocking clutch being provided with oppositely-disposed beveled faces, means for shifting the position of said rocking clutch, a plunger for engaging either of said beveled faces, and a leaf-spring for holding said plunger into engagement therewith.

FRANCIS ARTHUR RICH.

Witnesses:
GEORGE WILLIAM BASLEY,
PERCY HERBERT BASLEY.